Feb. 16, 1954 I. B. ROSENBERG 2,669,270
MACHINE FOR RESLICING BREAD
Filed Sept. 30, 1950 4 Sheets-Sheet 1
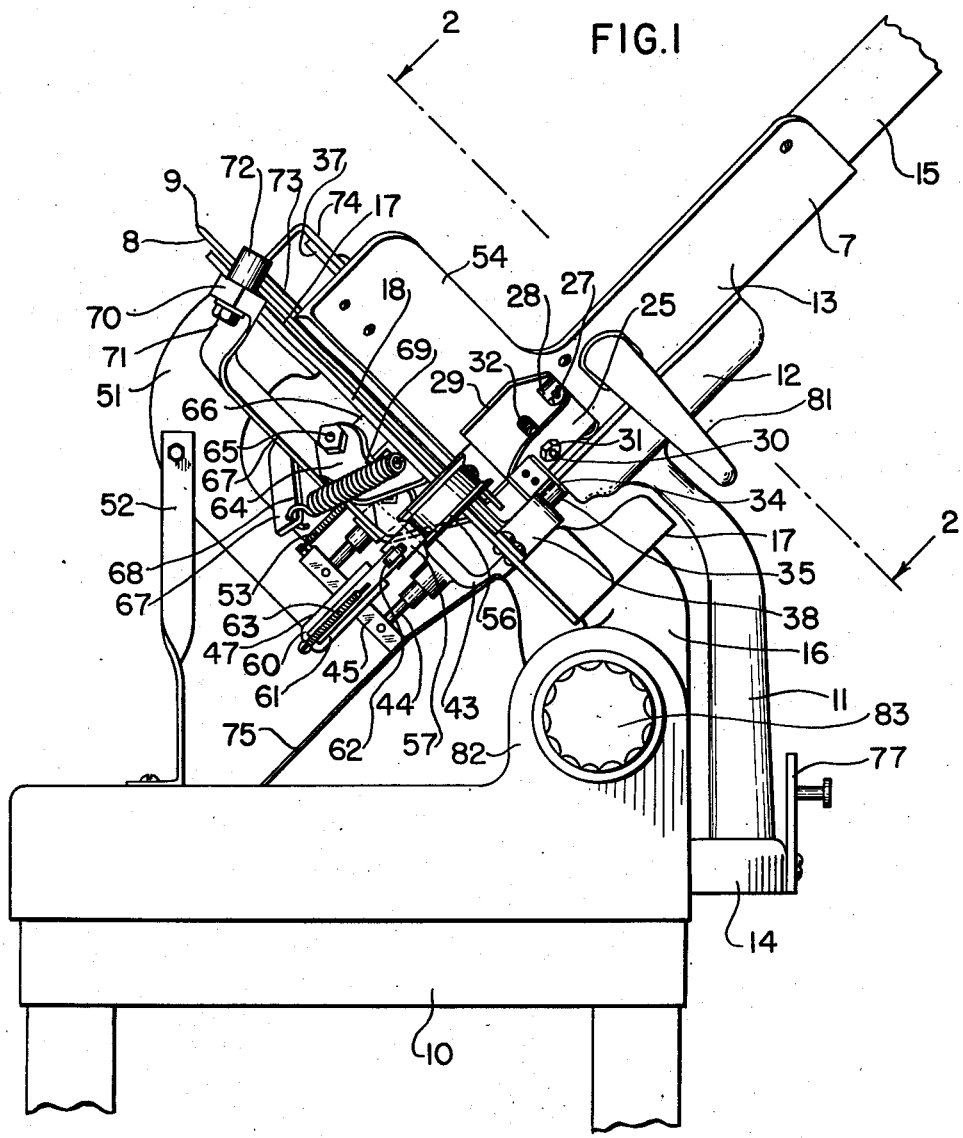
FIG. I
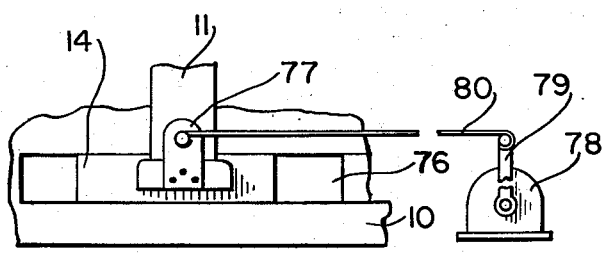
FIG. II
INVENTOR.
Isadore B. Rosenberg
BY
William F. Nickel
ATTORNEY Feb. 16, 1954  I. B. ROSENBERG  2,669,270
MACHINE FOR RESLICING BREAD
Filed Sept. 30, 1950  4 Sheets-Sheet 2

INVENTOR.
Isadore B. Rosenberg
BY
William F. Nickel
ATTORNEY

Feb. 16, 1954  I. B. ROSENBERG  2,669,270
MACHINE FOR RESLICING BREAD
Filed Sept. 30, 1950  4 Sheets-Sheet 3

INVENTOR.
Isadore B. Rosenberg
BY William F. Nickel
ATTORNEY

Feb. 16, 1954  I. B. ROSENBERG  2,669,270
MACHINE FOR RESLICING BREAD
Filed Sept. 30, 1950  4 Sheets-Sheet 4
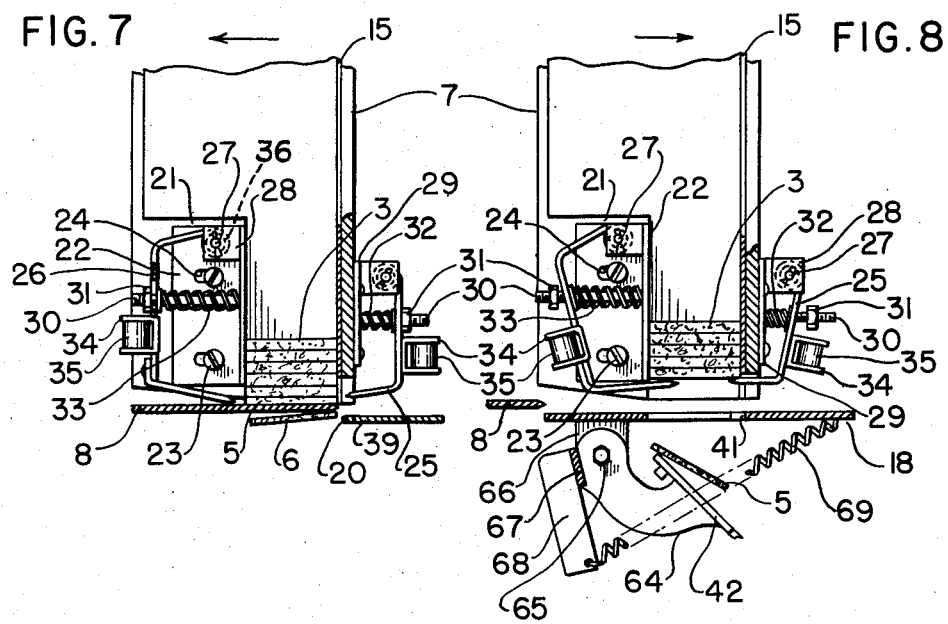
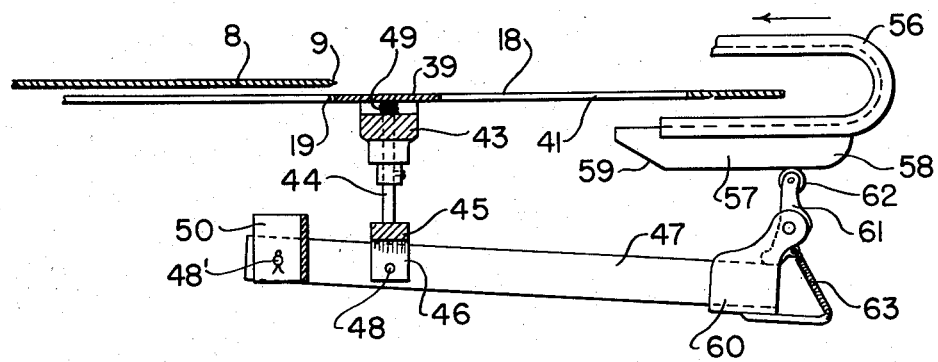
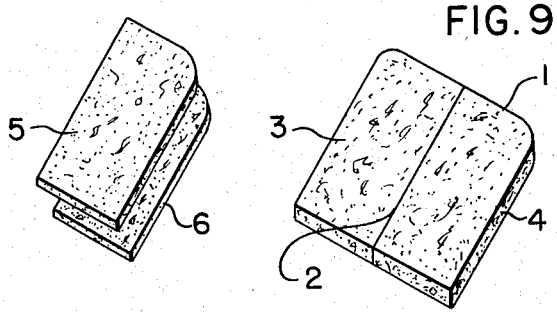
INVENTOR.
Isadore B. Rosenberg
BY
William F. Nickel
ATTORNEY Patented Feb. 16, 1954

2,669,270

UNITED STATES PATENT OFFICE 2,669,270

MACHINE FOR RESLICING BREAD

Isadore B. Rosenberg, Port Chester, N. Y., assignor of one-half to Paul Dean Arnold, Rye, N. Y.

Application September 30, 1950, Serial No. 187,761

7 Claims. (Cl. 146—73)

This invention is an improvement in machines for cutting bread and particularly machines for reslicing pieces of bread into thinner pieces or wafers suitable for toasting.

An important object of my invention is to provide a machine for operating upon pieces of bread of the usual thickness, and having parts for engaging and holding such pieces and dividing them into pieces of approximately half such thickness, by reslicing them through the middle in a plane parallel to the faces or sides thereof.

A further object is to provide a machine adapted to regulate the movement of the pieces of bread into proper position for reslicing; to perform the resilicing operation smoothly and effectively, without breaking the bread, by cutting the pieces into parts of equal size and half the original thickness; and finally to deliver the resliced parts freely in the best condition for further processing.

Another object is to provide a machine having members by which the delivery of the thinner pieces of bread after reslicing is so controlled that the wafers or thinner pieces are automatically separated before removal, so that handling is not required and the risk of tearing, or crumbling the bread and other damage is eliminated.

An additional object is to provide apparatus for reslicing pieces of bread so that one part of the resliced piece can be discharged from the machine at once, while the other part, which overlies the first, is carried to another point of exit, so that the parts are fully divided and detached from each other upon delivery, the apparatus having means for preventing another piece from moving into position to be sheared till the delivery of the resliced piece is completed.

The nature and advantages of the improvement are fully described herein, and the characteristics are pointed out. On the drawings a preferred design is illustrated, but the apparatus set forth herein is shown by way of example only, and variations in details of structure and mode of operation may be adopted without departure from the general plan which contains the principle of this invention.

On the drawings,

Figure 1 is an end view of a machine embodying this invention.

Figure 6 shows the same parts as Figure 5, with most of them in a different position.

Figure 7 is a section along the line 7—7 in Figure 2, seen as if the observer stood at the back of the machine, showing the hopper or chute in which the pieces of bread are moved into position for reslicing, with retaining and releasing elements in position for allowing a piece of bread to be fed to the cutter.

Figure 8 is a similar view with said elements in retaining position while the resliced bread is discharged from the machine.

Figures 9 and 10 show the piece of bread before and after reslicing; and

Figure 11 shows a detail of the connections for operating the machine from a source of power.

Figure 2:
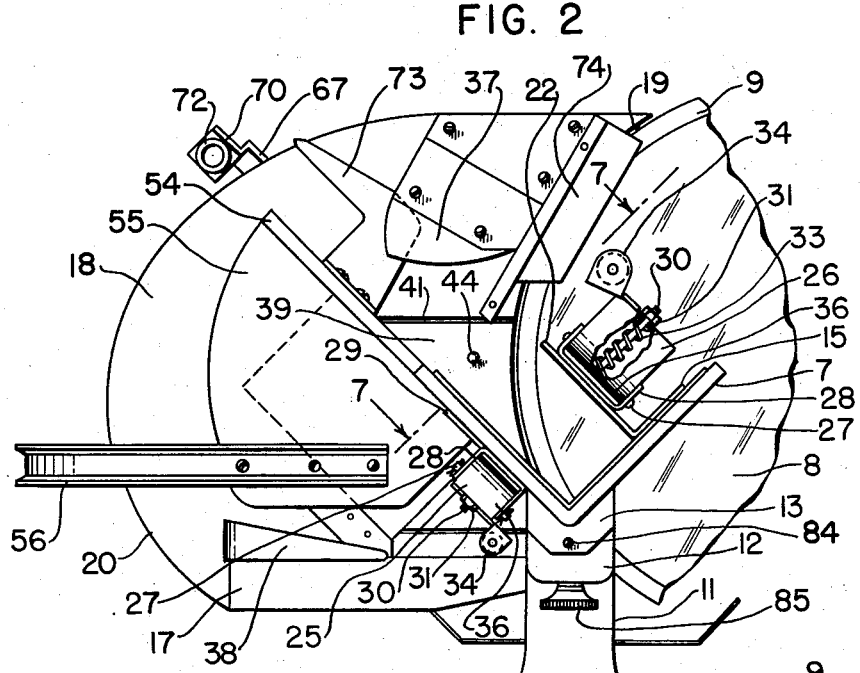
Figure 2 is a front view, seen from the line 2—2 on Figure 1.

In practice the machine operates, for example, upon slices of wheat or wholewheat or other bread of half the usual size and divides the half slices into two equal halves by cutting through them in a plane parallel to the two opposite faces thereof. A slice of bread equal in size to the full cross sectional area of the loaf is indicated at 1 in Figure 9. A loaf of bread which has been cut across to yield such slices is then cut centrally from end to end and down through from top to bottom, thus dividing each slice along the middle line 2 into two equal half slices 3 and 4. These half slices are stacked in the machine and each half slice is successively re-sliced into two equal pieces of half the thickness of the original slice, as illustrated at 5 and 6 in Figure 10. The half slices 5 and 6 of reduced thickness make wafers which can quickly be browned to produce what is usually called "Melba" toast.

The machine comprises a trough-shaped member 7 which has the form of a V in cross section, and a circular cutter disk 8 having a sharp cutting edge 9 running around the entire rim thereof. The cutter 8 is tilted or inclined to the vertical in one direction, and the member 7 is inclined in the opposite direction, and is perpendicular to the cutter. The disk 8 is revolved by a shaft rotating in fixed bearings, so that the cutter member 8 is always in one position, but the member 7 is so mounted that it can be moved sideways parallel to the plane of revolution of the cutter 8. The shaft carrying the cutter is of course coupled to any suitable source of power to drive it. The member 7 and the cutter 8 are supported by a framework having a horizontal top 10, and the member 7 is affixed to the top of a post or stanchion 11 which has on its upper end a rigid inclined channel-shaped seat 12 in which fits a long projection or a rib 13 on the bottom of the member 7. The stanchion 11 has a foot 14 which is slidably mounted on the top 10 so that the member 27 can receive lateral movement. The member 7 at its lower end is close to the plane of the cutter 8, but not quite flush therewith. In the member 7 is an angle plate 15, with relatively thin sides, and extending beyond the upper end of the member 7. This plate or liner serves as a chute or hopper in which the half pieces 3 and 4 are stacked. The pieces are fed downward to the lower end of the hopper, and the member 7 is moved sidewise to put each half slice by turns into position to be cut through by the blade 8. After each half slice is sheared through in this way the pieces 5 and 6 of reduced thickness, as shown in Figure 10, are permitted to drop from the machine into a delivery trough which guides them into a receptacle beneath the apparatus.

The framework of the machine comprises projection 16 which carries an inclined head 17 to which is affixed a back plate 18 which extends over the lower end of the chute or hopper 15. This plate or platen is inclined so as to be perpendicular to the length of the hopper 15, is parallel to the cutter 8 and lies at one side or just back of the plane of the cutter 8. One end of the back plate adjacent the cutter has a concave edge 19 conforming to the curved periphery of the cutter and close to the edge thereof, and the opposite end 20 is rounded or has any other suitable form. Adjacent this plate the liner 15 is cut away to make a recess on one side as indicated at 21; see Figures 7 and 8; and at the inner end of the recess is an angle plate 22 fixed to the adjacent inner face of the member 7. One side of the angle plate is parallel to the opposite side of the chute and forms a reduced exit of the same size and shape as the half slices 3 or 4. The half slices are loaded into the angular channel-shaped chute 15 in such position that their long edges are adjacent the angle piece 22 on the one side and the opposite inner face of the chute 15 on the other; and one shorter side edge of each half slice rests upon the remaining inner face of the chute 15. They come one by one into position to be sheared by the blade 8 as above described. These half slices are normally stopped at the lower end of the chute when the standard 11 supporting the chute 15 is moved to the end of its travel away from the cutter. When the standard is actuated in the opposite direction the lowermost half slice is released and forced out of the lower end of the chute and directly into the path of the cutting edge 9 of the blade 8.

The angle plate 21 is mounted so that it can be adjusted by means of screws 23 passing through slots 24 and into holes in the adjacent side of the member 7. Obstructing or arresting elements or catches for engaging the half slices at the discharge end of the chute are shown at 25 and 26. The former is secured on the outside of the member 7 and the latter is carried by the angle piece 22. Each of these arresting elements or means is mounted at one end on a pivot pin 27. For the retaining element 25, which is approximately L-shaped, the pin is engaged in a U-shaped bearing 28 fixed to a plate 29 on the member 7. The other retaining element 26 is approximately U-shaped and the pin 27 therefor is engaged in a similar bearing member 28 fixed to the outer face or back of the angle plate 22. The lower ends of these two elements are bent to project across the end of the chute 15 so as to obstruct and retain the half slices therein. The angle plate 22 and the plate 29 have fixed threaded studs 30 which extend outward through openings in the retaining elements 25 and 26 and carry stop nuts 31. The stud 30 for the element 25 is encircled by a compression spring 32 between this element and the plate 29, and the other retaining element 26 is engaged by a spring 33 on the stud 30 between the angle member 22 and this element 26; the action of both springs being to push the elements outward and release the half slices in the chute 15. Each of the retaining and releasing elements 25 and 26 has a bracket 34 on its outer face or back carrying a roller 35. The two catch elements 25 and 26 are curled over at one end to form bearings 36 through which the pins 27 are passed.

When the stanchion 11 with the hopper 15 is moved away from the cutter as far as it will go, the roller 35 of the element 26 strikes against the edge of a cam plate 37 fixed to the upper edge of the plate 18 and projecting therefrom. The roller 35 for the element 25 simultaneously engages the edge of a cam piece 38 mounted on the head 17 or plate 18. Thus the two elements 25 and 26 are forced inward into holding position, as illustrated in Figure 8.

Figure 5:
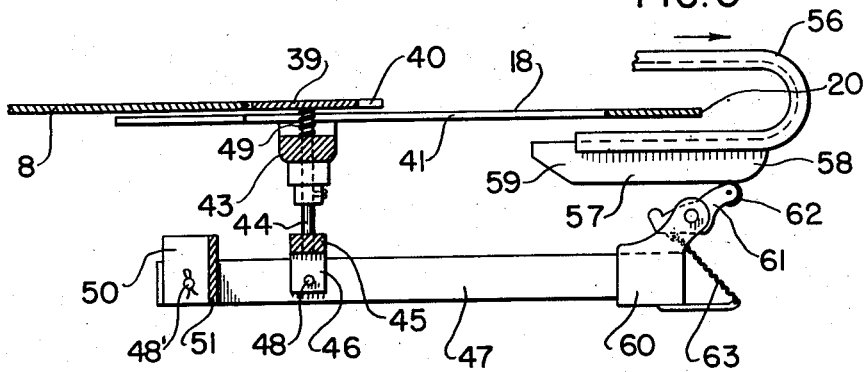
Figure 5 is a section on line 5—5 of Figure 4.

The plate 18 of the apparatus has an irregular opening or recess 41 extending inward from the concave edge 19. Adjacent this edge the opening is occupied by a stop plate or controlling member 39 having one side curved to match the curve of the edge 19, and the opposite side notched as indicated at 40. The inner end of this recess 41 is enlarged in a diagonal direction and is of such shape as shown to match a door or gate 42 that fits within the area of the enlargement and the notched side 40 of the plate 39. The plate 39 and the gate 42 cooperate with the lower end of the chute 15, and the door is opened rearward to discharge one of the thin wafers of bread after the discharge of the other thin wafer when the cutting action of the blade 8 is finished. The stop plate 39 lies in front of a U-shaped bracket or bar 43 which bridges the top and bottom edges of the recess or opening 41 in the plate 18. This bar has bearings for pins 44 which are fixed to the plate 39 at one end. These pins 44 can slide in the bar 43, and the pins are fixed at their outer ends to a short bar 45 which has perforated lugs 46 to receive between them a lever 47 behind the platen 18, this lever and the bar 45 being pinned together as shown in Figures 5 and 6. The lever is back of the platen 18 and swings toward and from this plate. Between the stop plate 39 and the bar 43 are compression springs 49 surrounding the pins 44, and the lever 47 is shown secured between lugs 46 of the bar 45 by a pivot pin 48. The lugs 50 are parts of a bar 51 which is secured to the back of the plate 18 and extends downward, overlapping part of the cutter 8 at the rear. This bar 51 (Figure 1) is supported or engaged by an upright brace 52 which rests upon the back of the framework 10. A spring 53 affixed to the cross bar 45 and to the platen 18 or one end of the bar 43 tends to pull the lever 47 towards the platen 18. The lever 47 is mounted to be movable about one end on a pivot 48' held by cotter pins in the lugs 50.

The member 7 has an extension 54 at one side near the plate member 18, and this extension carries a plate or fin 55 which extends downward towards the head 17. To the plate 55 is attached one end of a cam bar 56 that is bent around the end 20 of the plate 18 and carries a cam piece 57 adjacent the free end of the lever 47. One end of this cam is rounded as shown at 58 and the other end, which lies closer to the bar 43 is bevelled or inclined as shown at 59. The adjacent or free end of the lever 47 carries a head 60 to which is attached a small pivoted lever or arm 61 having at its outer end a roller 62. The opposite end of this arm is connected by a spring 63 to a projection on the head 60, and the action of the spring is such that it normally pulls the arm into position perpendicular to the lever, as shown in Figure 6. The lower end of the arm 61 then abuts the lever and cannot move any further.

The back of the gate 42 has a pair of fixed arms 64 mounted upon a pin 65 secured in bearings carried by a U-shaped member 66 secured to the back of the platen 18. Attached to the arms 64 and extending across the same is an operating bar 67 to which is secured finger 68 connected to the rear face of the plate 18 by a spring 69. This spring normally holds the gate in closed position. The lever or bar 67 extends beyond the top of the plate 18 and is bent forward and upward as shown at 70. It carries a bolt 71 on which is mounted a roller 72; and on the element 7 is carried an arm 73 which is angle-shaped and is in position to strike the roller 72 when the chute moves away from the blade 8. The concave end 19 of the plate 18 carries a guard plate 74 for the cutter 8 adjacent the chute 15 and the cam plate 37.

In operation, the chute is loaded with half slices 3 and 4, and the cutter disk 8 is started rotating. At first the stanchion 11 with the chute 15 should be moved to the extreme left, with reference to Figures 2 and 3; that is, away from the cutter 8. The cam edges of the plates or cam means 37 and 38 then engage the rollers 35 and force the catch elements 25 and 26 inward, as illustrated in Figure 8, so as to prevent the exit of the pieces of bread from the lower end of the chute 15. When this motion of the chute takes place, the cam 57 is moved to the right (Figure 5) by the bent bar 56 till the bevelled end 59 of the cam 57 is directly opposite the roller 62 of the arm 61. The spring 63 now turns the arm 61 outward, as indicated on Figure 6, from the lever 47. When the chute is next moved towards the cutter disk, the cam edges 37 and 38 release the rollers 35 and the springs 32 and 33 force the elements 25 and 26 outward allowing a piece or half slice of bread in the chute 15 to drop against the gate 42, which is now closed. The pieces of bread stacked in the chute are either pressed downward by hand or by an automtic feeder. Also the movement of the bar 56 in the opposite direction causes the arm 61 to push the lever 47 away from the plate 18 by the action of the bevelled end 59 of the cam 57; hence the lever 47 is swung rearward as shown in Figure 6. This pulls the stop plate 39 into the recess 41 till it is flush with the back plate 18. A piece of bread resting on this plate is then in position to be properly cut through the middle by the disk 8. The movement of the stanchion and the hopper continues till the hopper reaches the position shown in Figure 7 with the hopper just past the member 39. At this point, the lower wafer 6 is completely severed from the upper wafer 5. Until the shearing is entirely finished the two wafers of course cling to each other. When, however, the cutter 8 has sheared through the bread, the wafer 6 is free to drop. The chute is now past the edge of the member 39, and the lower wafer 6 falls past this member into a trough or channel 75. But the other wafer 5 is restrained by the disk 8.

The chute now moves again towards the end 20 of the plate 18. The wafer 6 then stays in the chute because it is drawn over on the member 39, before it is out of contact with the cutter 8. The bar 56 moving with the hopper, pulls the cam 57 so that the rounded end 58 turns the arm 61 against the force of the spring 63; and the springs 49 and 53 now force the lever 47 into the position shown in Figure 5, with the member 39 in the plane of the cutter but moving away from it. The undischarged wafer 6 then passes a little further down the chute as it comes upon the gate 42. This gate is inclined so that its long edges are parallel to the long edges of the half slices of bread in the chute 15; and thus it registers with the wafer 6 as soon as the chute is back far enough for the arm 73 to hit the roller 72, and bar 67 opens the gate 42. The other piece 5 then falls out through the gate into the trough 75. This trough discharges the wafers into a suitable receptacle beneath the apparatus. When the gate opens, the catches 25 and 26 hold the other pieces of bread in the chute as above described; and when the chute again moves toward the cutter, the spring 69 closes the gate 42.

The half slices 3 and 4 are thus sheared through into wafers of the same length and width as the half slices but only half the thickness. The wafers are cleanly severed, displaced from each other, and delivered at separate points without tearing or breaking or crumbling; and no handling is necessary except to remove them in bulk from the receptacle to which the trough 75 delivers them.

This action is greatly facilitate by the fact that the sides of the chute 15 and the half slices therein are inclined. Hence the cutter shears first into an advancing half slice at its forward lower corner and always a clean and smooth cut is produced.

Figures 1 and 11 show the stanchion with an operating arm 77 joined to a source of power 78 adapted to rock a lever 79 connected to the arm 77 by a link 80. The arm 77 is joined to the foot 14 of the stanchion 11 carrying the chute 15, and this foot moves in a horizontal guideway 76 in the top 10 of the supporting framework. The unit 78 is designed to swing the chute towards and from the cutter 8 through the proper distance and at the correct speed. The member 7 may also have a handle 81 for manual operation, with the unit 78 uncoupled.

Figure 3:
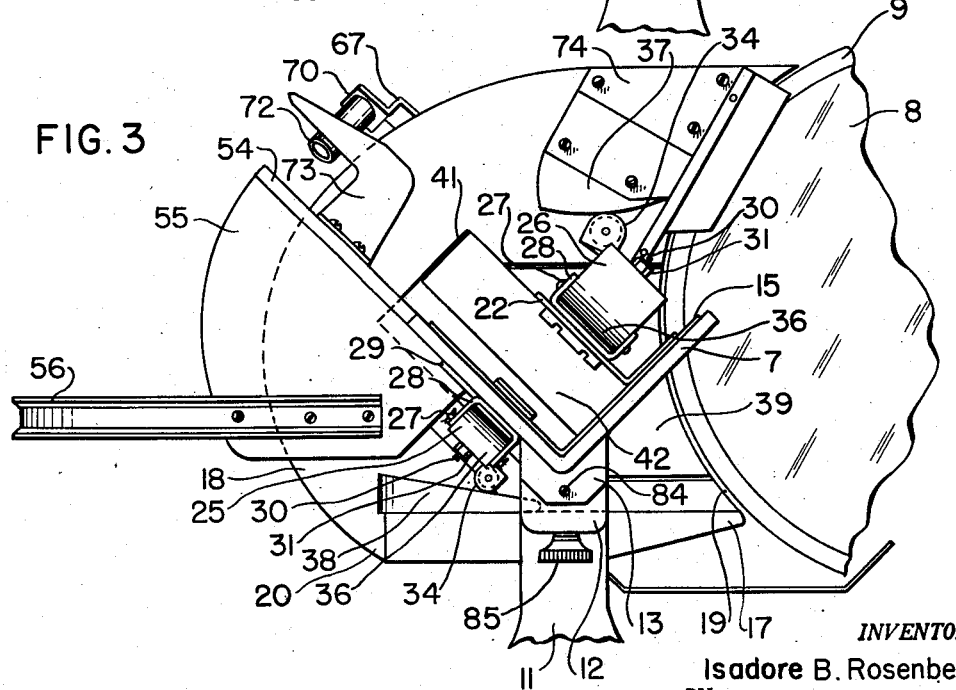
Figure 3 is the same view as Figure 2, with the parts in different operative positions.
Figure 4:
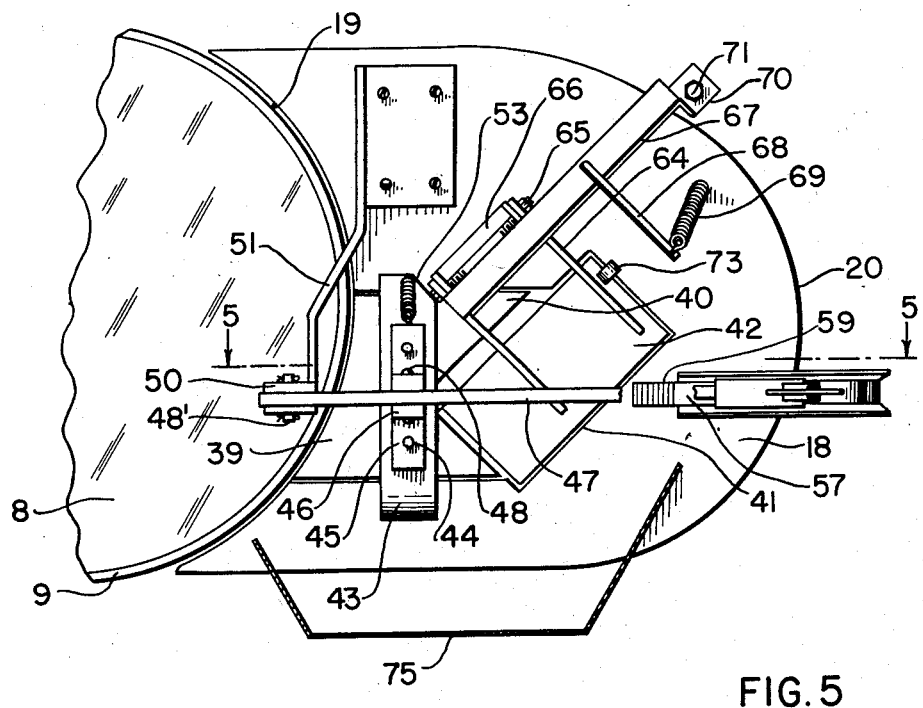
Figure 4 is a rear or bottom view of said machine.

For the sake of clearness the head 17 and the projection 16 are not shown in Figures 2 and 3. The head 17 may be adjustable, by itself or with the projection 16, to control the position of the plate 18 with respect to the lower end of the chute 15, and thus enable the cutter 8 to shear the pieces exactly through the middle. A knob for this purpose is indicated at 83, in a bearing 82 on Figure 1. The means by which such adjustment is effected need not be further illustrated or described, as it is no part of this invention. Also the projection 13 may be mounted to slide for adjustment on a rod 84 fixed to the seat 12, and be held by a screw 85.

The gate 42 is omitted from Figures 5 and 6 and the member 39 from Figure 8 for the sake of convenience and clearness, the relative positions of these parts being fully indicated in other views on the drawings.

Having described my invention, what I believe to be new is:

1. The combination of a cutter, a hopper movable towards and from the cutter for feeding objects to be sliced to the cutter, obstructing means on the delivery end of the hopper and movable therewith, said means being normally out of operative position, means in the path of movement of the hopper to actuate the obstructing means to operative position, a back plate having a delivery opening adjacent the cutter, a stop member and a movable gate in said opening, means carried by the back plate for operating said member and said gate, and parts secured to the hopper for actuating the last-named means.

2. The combination of a cutter, a hopper for feeding objects out of one end to said cutter, movable obstructing means on said hopper adjacent said end, means for mounting the hopper to be movable towards and from the cutter, means on the hopper for holding the obstructing means inoperative when the hopper is moved towards the cutter, a back plate adjacent said end of the hopper, said plate having an opening, a movable gate in said opening, and means on said plate in the path of the movement of the hopper and operated by the hopper when moved away from the cutter for impelling said obstructing means into operative position and displacing said gate from the opening.

3. The combination of a cutter, a hopper for feeding objects out of one end to the cutter, movable obstructing means on the hopper adjacent said end, means for mounting said hopper to be movable towards and from the cutter, means on the hopper for holding the obstructing means inoperative when the hopper is moved towards the cutter a back plate adjacent said end, said plate having an opening, a stop member in said opening adjacent the cutter, and normally projecting from the plate, and means actuated by the hopper to withdraw said member when the hopper is moved towards the cutter and release it when the hopper is moved in the opposite direction, and for operating the obstructing means into operative position when the hopper has been moved away from the cutter.

4. The combination of a cutter, a hopper for feeding objects out of one end to the cutter and movable towards and from the latter, a back plate adjacent said end and having an opening, a stop member in said opening in proximity to the cutter, a movable gate in said opening beside said member, means for holding said gate in said opening and said member projecting through the opening, movable obstructing means on the hopper adjacent said end, means on the hopper for holding the obstructing means inoperative when the hopper is moving towards the cutter, and means on said plate for withdrawing said member into the opening when the hopper is moved toward the cutter, and for displacing the gate from the opening and actuating said obstructing means into retaining position when the hopper has been moved away from the cutter, and parts secured to the hopper and movable therewith for actuating said means on said plate.

5. In a machine to sever bread slices into thin halves, the combination of a cutter, a movable hopper, means for supporting the cutter and the hopper in operative relation to each other, with the hopper movable sidewise toward and from the cutter, movable obstructing means on the delivery end of the hopper, fixed means on the supporting means to actuate said obstructing means to operative position when the hopper moves away from the cutter, a plate having a delivery opening adjacent the delivery end of the hopper, a stop member adjacent the opening, and means for controlling said member to cause it to project beyond said opening when the hopper is moved away from the cutter and be withdrawn into the opening when the hopper is moved towards the cutter.

6. In a machine to sever bread slices into thin halves, the combination of a rotatable cutter, a movable hopper, means for mounting the hopper and the cutter for relative sidewise movement towards and from each other, movable obstructing means on the delivery end of the hopper, fixed means for actuating said obstructing means to operative and release positions, a plate having a delivery opening adjacent the delivery end of the hopper, and a gate carried by the plate operated by the hopper for controlling said opening.

7. In a machine for cutting bread slices into thinner halves, the combination of a cutter disk, a hopper having one end adjacent said disk and mounted to move sidewise parallel to the plane of the disk towards and from the latter, a fixed plate having one end in proximity to the edge of the disk and extending across said end of the hopper, the plate having a recess in its said end opening therethrough, a stop member in said recess adjacent said disk and projecting from the face thereof toward the hopper and into the plane of the disk when the hopper is moved away from the disk, a gate to said plate and in said recess beside said member, movable obstructing means on the hopper at said end, means on the hopper for holding said obstructing means out of operative position when the hopper is close to the disk, means on said plate for retracting the stop member into the recess when the hopper is moved towards the disk, and for displacing the gate from the recess and actuating the obstructing means into operative position when the hopper is moved away from the disk, said means for operating the member and gate comprising two levers on the opposite face of the plate, one connected to the gate and the other to the member, and an arm and a bar carrying a cam fixed relative to the hopper and movable therewith, for separately engaging said levers, and elements fixed relative to the plate and having cam edges in the path of movement of the hopper for moving the obstructing means into operative position when the hopper is moved away from the disk.

ISADORE B. ROSENBERG.

References Cited in the file of this patent

UNITED STATES PATENTS

| Number | Name | Date |
|---|---|---|
| 1,192,014 | Stiles | July 25, 1916 |
| 2,004,601 | Folk | June 11, 1935 |
| 2,036,759 | Wood | July 13, 1937 |
| 2,103,567 | Van Berkel | Dec. 28, 1937 |
| 2,206,154 | Bixler | July 2, 1940 |
| 2,242,935 | Ahrndt | May 20, 1941 |
| 2,279,376 | Marriott | Apr. 14, 1942 |
| 2,478,159 | Melpolder | Aug. 2, 1949 |
| 2,513,741 | Pinaud | July 4, 1950 |

FOREIGN PATENTS

| Number | Country | Date |
|---|---|---|
| 17,799 | Great Britain | of 1908 |